United States Patent
Shi et al.

(10) Patent No.: US 7,747,076 B2
(45) Date of Patent: Jun. 29, 2010

(54) MASS SEGMENTATION USING MIRROR IMAGE OF REGION OF INTEREST

(75) Inventors: Chao Shi, Cupertino, CA (US); Daniel Russakoff, Mountain View, CA (US)

(73) Assignee: FUJIFILM CORPORATION, Tokyo (JP)

(*) Notice: Subject to any disclaimer, the term of this patent is extended or adjusted under 35 U.S.C. 154(b) by 859 days.

(21) Appl. No.: 11/642,921

(22) Filed: Dec. 21, 2006

(65) Prior Publication Data
US 2008/0152220 A1    Jun. 26, 2008

(51) Int. Cl.
G06K 9/34    (2006.01)
G06K 9/00    (2006.01)

(52) U.S. Cl. .................. 382/173; 382/132
(58) Field of Classification Search .......... 382/173, 382/171, 128, 131–132, 276, 281–283, 308, 382/199; 378/37; 128/922; 435/4
See application file for complete search history.

(56) References Cited

U.S. PATENT DOCUMENTS

| 5,631,982 A * | 5/1997 | Inselberg et al. ......... 382/281 |
| 5,657,362 A * | 8/1997 | Giger et al. .............. 378/37 |
| 6,035,056 A | 3/2000 | Karssemeijer |
| 6,891,964 B2 * | 5/2005 | Doi et al. ............... 382/131 |
| 2007/0058865 A1 * | 3/2007 | Li et al. ................. 382/173 |
| 2007/0092864 A1 * | 4/2007 | Reinhardt et al. ........ 435/4 |
| 2009/0003670 A1 * | 1/2009 | Gu et al. ................ 382/128 |

OTHER PUBLICATIONS

Timp et al., "A New 2D Segmentation Method based on Dynamic Programming Applied to Computer Aided Detection in Mammography", Medical Physics, vol. 31, No. 5, May 2004.

* cited by examiner

Primary Examiner—Sherali Ishrat
(74) Attorney, Agent, or Firm—Birch, Stewart, Kolasch & Birch, LLP

(57) ABSTRACT

A method and an apparatus for automatic segmentation of an image representing a mass of a tissue region based on dynamic programming that guarantees an accurate and closed contour of the mass is disclosed. The method according to one embodiment accesses digital image data representing an image including the mass of the tissue region, creates a mirror image of the digital image data, extracts a Region of Interest (ROI) which includes a portion of the mirror image containing the mass, transforms the ROI to polar space for obtaining a polar image of the ROI, assigns local cost to sub portions of the polar image, and finds a contour of the mass based on the assigned local cost.

22 Claims, 10 Drawing Sheets

MASS SEGMENTATION USING MIRROR IMAGE OF REGION OF INTEREST

BACKGROUND OF THE INVENTION

1. Field of the Invention

The present invention relates to a digital image processing technique, and more particularly to a method and apparatus for automatic mass segmentation based on dynamic programming.

2. Description of the Related Art

Mass segmentation plays a crucial role in diagnosis of medical problems of breasts or other tissues. Computer-aided diagnosis (CAD) systems are well known for classification of suspicious regions as normal, benign, or malignant. An important feature in CAD algorithms is the segmentation of tissue masses and finding an accurate contour of a suspected mass. Currently, there are two algorithms for automatic mass segmentation: region growing and discrete contour model.

An example of a region growing algorithm includes assigning each pixel to a particular region. However, one of the problems of region growing algorithm is that it makes unnecessary small and low-contrast structures as part of the suspected mass. Thus, the region growing algorithm may fail to produce an accurate closed contour of the mass and the resulting segmentation may become too large.

The discrete contour model algorithm attempted to solve the problem of region growing algorithm by building a deformable contour of the suspected mass. The main drawback of using the discrete contour model is that the algorithm requires an initial estimate of the contour that is close to the actual boundary of the mass. As a result, the algorithm may fail to find an actual contour of the suspected mass and may find the contour of other unsuspected masses.

Disclosed embodiments of this application address these and other issues by using a dynamic programming algorithm that provides an accurate and closed contour of a suspected mass.

SUMMARY OF THE INVENTION

The present invention is directed to a method and an apparatus for automatic segmentation of an image representing a mass of a tissue region based on dynamic programming that provides an accurate and closed contour of the mass. According to a first aspect of the present invention, a mass segmentation method comprises: accessing digital image data representing an image including said mass of the tissue region, creating a mirror image of said digital image data, extracting a Region of Interest (ROI) which includes a portion of said mirror image containing said mass, transforming the ROI to polar space for obtaining a polar image of the ROI, assigning local cost to sub portions of said polar image, and finding a contour of the mass based on said assigned local cost.

According to a second aspect of the present invention, an apparatus for automatic segmentation of an image representing a mass of a tissue region comprises: an image data input unit for accessing digital image data representing an image including said mass of the tissue region, a mirror image obtaining unit for creating a mirror image of said digital image data, a Region of Interest (ROI) extraction unit for extracting a ROI which includes a portion of said mirror image containing said mass, an image transforming unit for transforming said ROI to polar space for obtaining a polar image of the ROI, a local cost assignment unit for assigning local cost to sub portions of said polar image, and a dynamic programming unit for finding a contour of the mass based on said assigned local cost.

According to a third aspect of the present invention, a method for segmenting an image representing a mass of a tissue comprises: accessing digital image data representing an image including a tissue region, extracting from said digital image data a Region of Interest (ROI) surrounding the mass, transforming the ROI to polar space for obtaining a polar image of the ROI, calculating an edge strength of the mass from said polar image, calculating an expected gray level which corresponds with an edge of the mass by using Gaussian mixture, calculating an expected mass radius by using data from said expected gray level, assigning local cost to sub portions of said polar image as a weighted combination of the edge strength, expected gray level, and expected mass radius, wherein weight of the edge strength is larger in value than weight of the expected gray scale, and finding a contour of the mass based on the assigned local costs.

According to a fourth aspect of the present invention, an apparatus for automatic segmentation of an image representing a mass of a tissue region comprises: an image data input unit for accessing digital image data representing an image including said mass of the tissue region, a Region of Interest (ROI) extraction unit for extracting a ROI surrounding the mass, an image transforming unit for transforming said ROI to polar space for obtaining a polar image of the ROI, an edge detection unit for calculating an edge strength of the mass from said polar image, a gray level calculation unit for calculating an expected gray level which corresponds with the edge of the mass by using Gaussian mixture, a mass radius calculation unit for calculating an expected mass radius by using data from said expected gray level, a local cost assignment unit for assigning local cost to sub portions of said polar image as a weighted combination of said edge strength, said expected gray level, and said expected mass radius, wherein the weight of the edge strength is larger in value than the weight of the expected gray level, and a dynamic programming unit for finding a contour of the mass based on said assigned local cost.

BRIEF DESCRIPTION OF THE DRAWINGS

Further aspects and advantages of the present invention will become apparent upon reading the following detailed description in conjunction with the accompanying drawings, in which.

DETAILED DESCRIPTION

Figure 1:
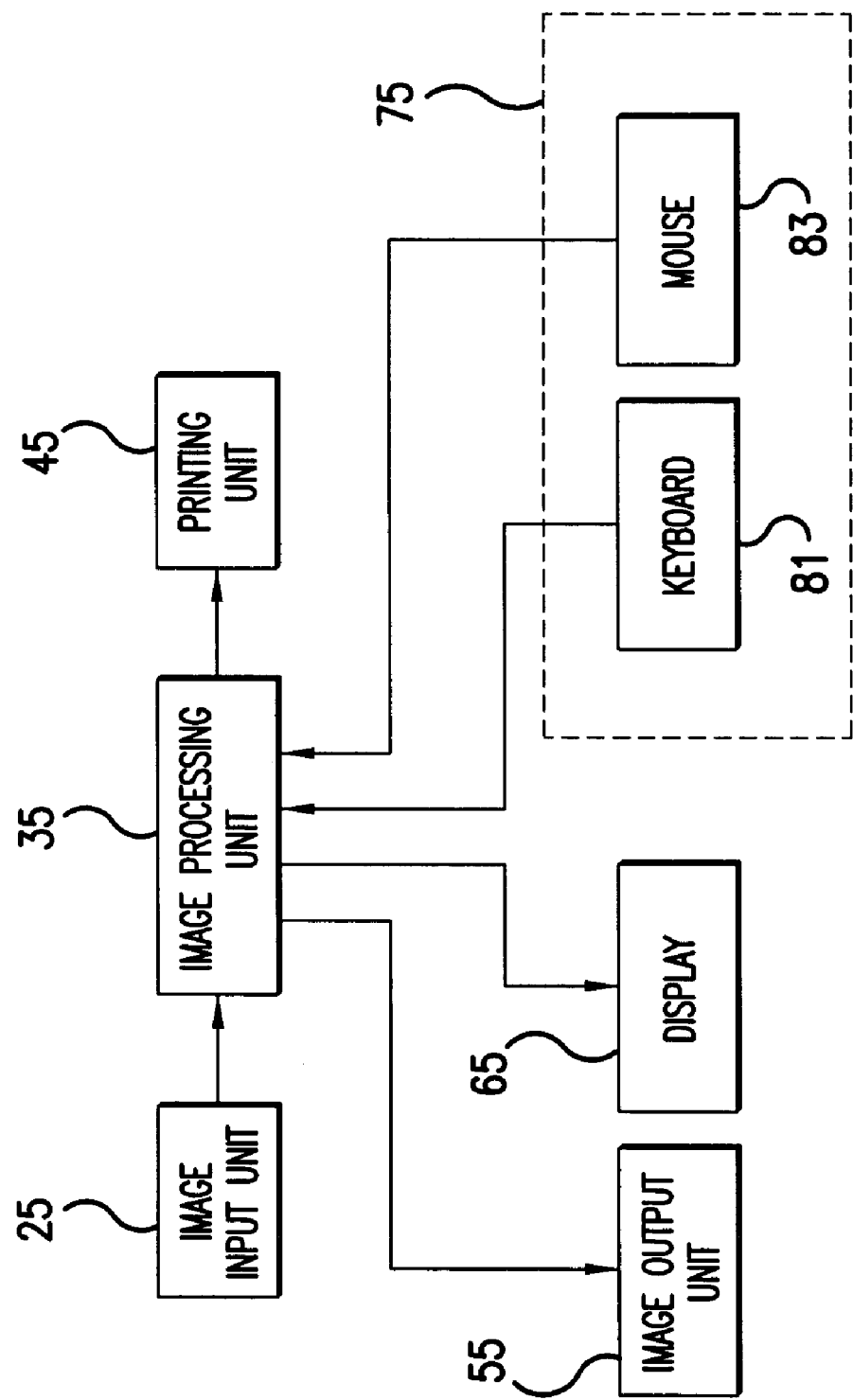
FIG. 1 is a general block diagram of a system including an image processing unit for mass segmentation according to an embodiment of the present invention.

Aspects of the invention are more specifically set forth in the accompanying description with reference to the appended figures. FIG. 1 is a general block diagram of a system including an image processing unit for mass segmentation according to an embodiment of the present invention. The system 80 illustrated in FIG. 1 includes an image input unit 25, an image processing unit 35, a display 65, an image output unit 55, a user input unit 75, and a printing unit 45. Operation of the system 80 in FIG. 1 will become apparent from the following discussion.

The image input unit 25 provides digital image data representing a mass M of a tissue (e.g., breast). Image input unit 25 may be one or more of any number of devices providing digital image data derived from a radiological film, a diagnostic image, a digital system, etc. Such an input device may be, for example, a scanner for scanning images recorded on a film; a digital camera; a digital mammography machine; a recording medium such as a CD-R, a floppy disk, a USB drive, etc.; a database system which stores images; a network connection; an image processing system that outputs digital data, such as a computer application that processes images; etc.

The image processing unit 35 receives digital image data from the image input unit 25 and performs mass segmentation in a manner discussed in detail below. A user, e.g., a radiology specialist at a medical facility, may view the output of image processing unit 35 via display 65 and may input commands to the image processing unit 35 via the user input unit 75. In the embodiment illustrated in FIG. 1, the user input unit 75 includes a keyboard 81 and a mouse 83, but other conventional input devices could also be used.

In addition to performing mass segmentation in accordance with embodiments of the present invention, the image processing unit 35 may perform additional image processing functions in accordance with commands received from the user input unit 75. The printing unit 45 receives the output of the image processing unit 35 and generates a hard copy of the processed image data. In addition or as an alternative to generating a hard copy of the output of the image processing unit 35, the processed image data may be returned as an image file, e.g., via a portable recording medium or via a network (not shown). The output of image processing unit 35 may also be sent to image output unit 55 that performs further operations on image data for various purposes. The image output unit 55 may be a module that performs further processing of the image data, a database that collects and compares images, etc.

Figure 2:
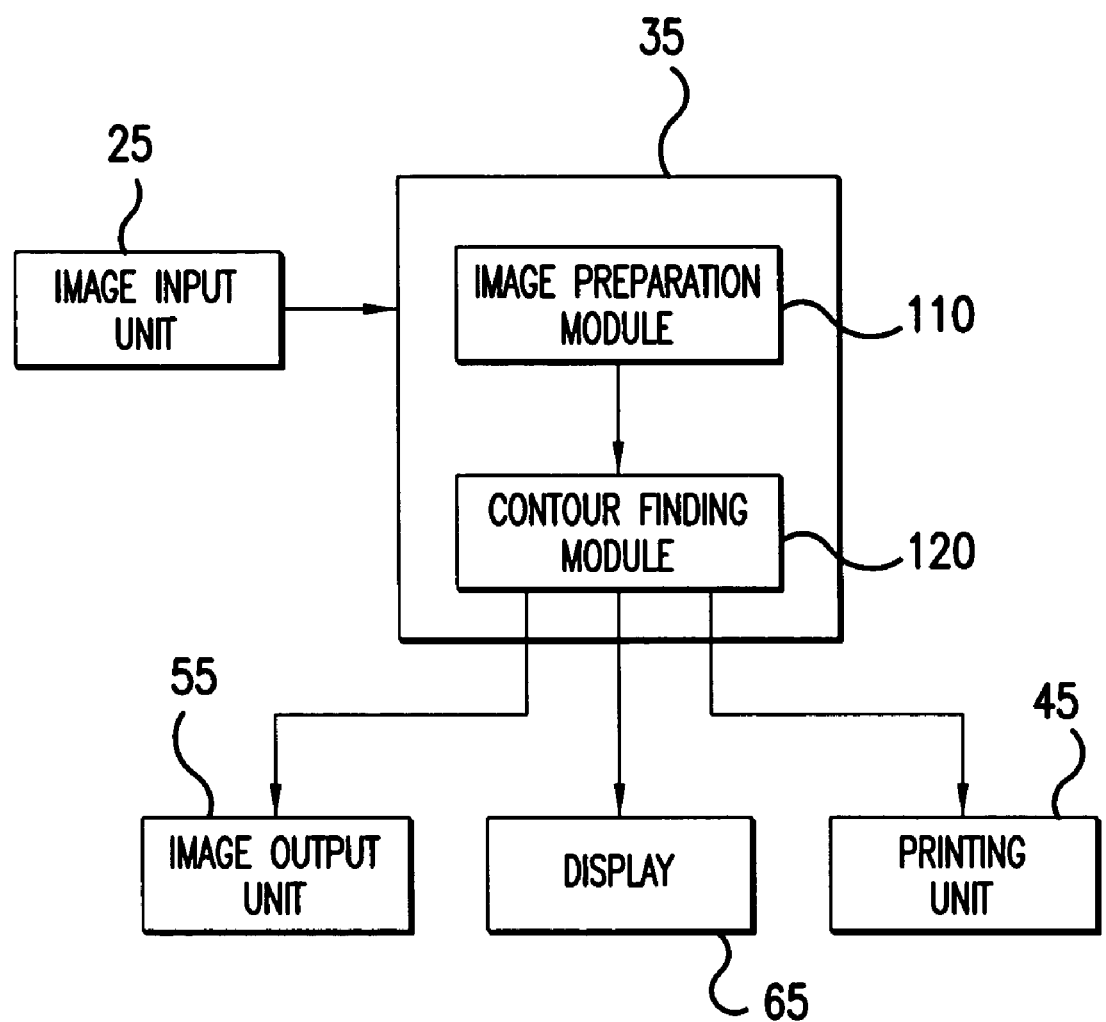
FIG. 2 is a block diagram illustrating in more detail aspects of the image processing unit for mass segmentation according to an embodiment of the present invention.

FIG. 2 is a block diagram illustrating in more detail aspects of the image processing unit 35 for mass segmentation according to an embodiment of the present invention. As shown in FIG. 2, the image processing unit 35 according to this embodiment includes: an image preparation module 110 and a contour finding module 120. Although the various components of FIG. 2 are illustrated as discrete elements, such an illustration is for ease of explanation and it should be recognized that certain operations of the various components may be performed by the same physical device, e.g., by one or more microprocessors.

Generally, the arrangement of elements for the image processing unit 35 illustrated in FIG. 2 performs preprocessing and preparation of digital image data including a breast image, mass segmentation in the breast image, and construction of a contour of the mass. Image preparation module 110 receives a breast image from image input unit 25 and may perform preprocessing and preparation operations on the breast image. Preprocessing and preparation operations performed by image preparation module 110 may include obtaining a mirror image, extracting a region of interest (ROI), converting the ROI into a polar image, etc.

Image preparation module 110 sends the preprocessed breast image to contour finding module 120, which finds a final contour of the mass M in the breast image. The contour finding module 120 outputs a breast image with the final contour of the mass M. The output of contour finding module 120 may be sent to image output unit 55, printing unit 45, and/or display 65. Operation of the components included in the image processing unit 35 illustrated in FIG. 2 will be next described with reference to FIGS. 3-7C.

Image preparation module 110 and contour finding module 120 are software systems applications. Image preparation module 110 and contour finding module 120 may also be purpose built hardware such as FPGA, ASIC, etc.

Figure 3:
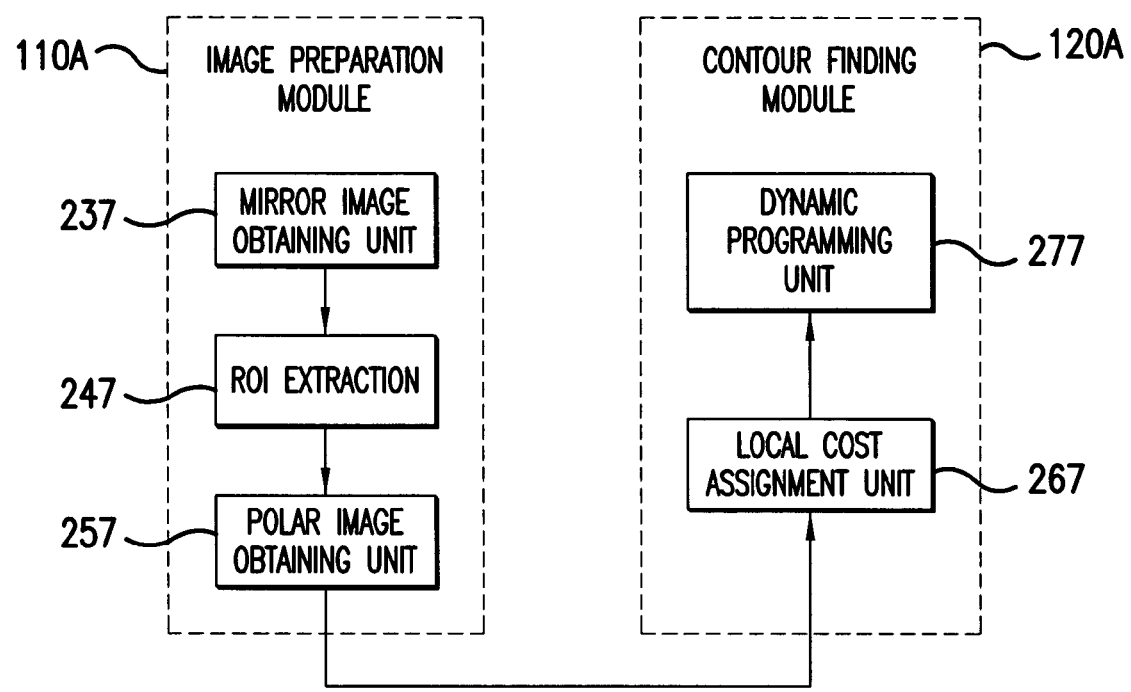
FIG. 3 is a block diagram of an exemplary image processing unit for mass segmentation of a breast tissue according to an embodiment of the present invention illustrated in FIG. 2.

FIG. 3 is a block diagram of an exemplary image processing unit 35A for mass segmentation according to an embodiment of the present invention illustrated in FIG. 2. As shown in FIG. 3, image processing unit 35A includes: a mirror image obtaining unit 237; a ROI extraction unit 247; a polar image obtaining unit 257; a local cost assignment 267; and a dynamic programming unit 277.

Mirror image obtaining unit 237, ROI extraction unit 247 and polar image obtaining unit 257 are included in image preparation module 110A. Local cost assignment 267 and dynamic programming unit 277 are included in contour finding module 120A. The arrangement of elements for the image processing unit 35A illustrated in FIG. 3 performs preprocessing and preparation of a breast image including the mass M, performs mass segmentation and finds a final closed contour of the mass M. The output of dynamic programming unit 277 is a breast image with a final closed contour of the mass M. Such an output image may be sent to image output unit 55, printing unit 45, and/or display 65. Mirror image obtaining unit 237, ROI extraction unit 247, polar image obtaining unit 257, local cost assignment 267, and dynamic programming unit 277 may be implemented using software and/or hardware.

Figure 3A:
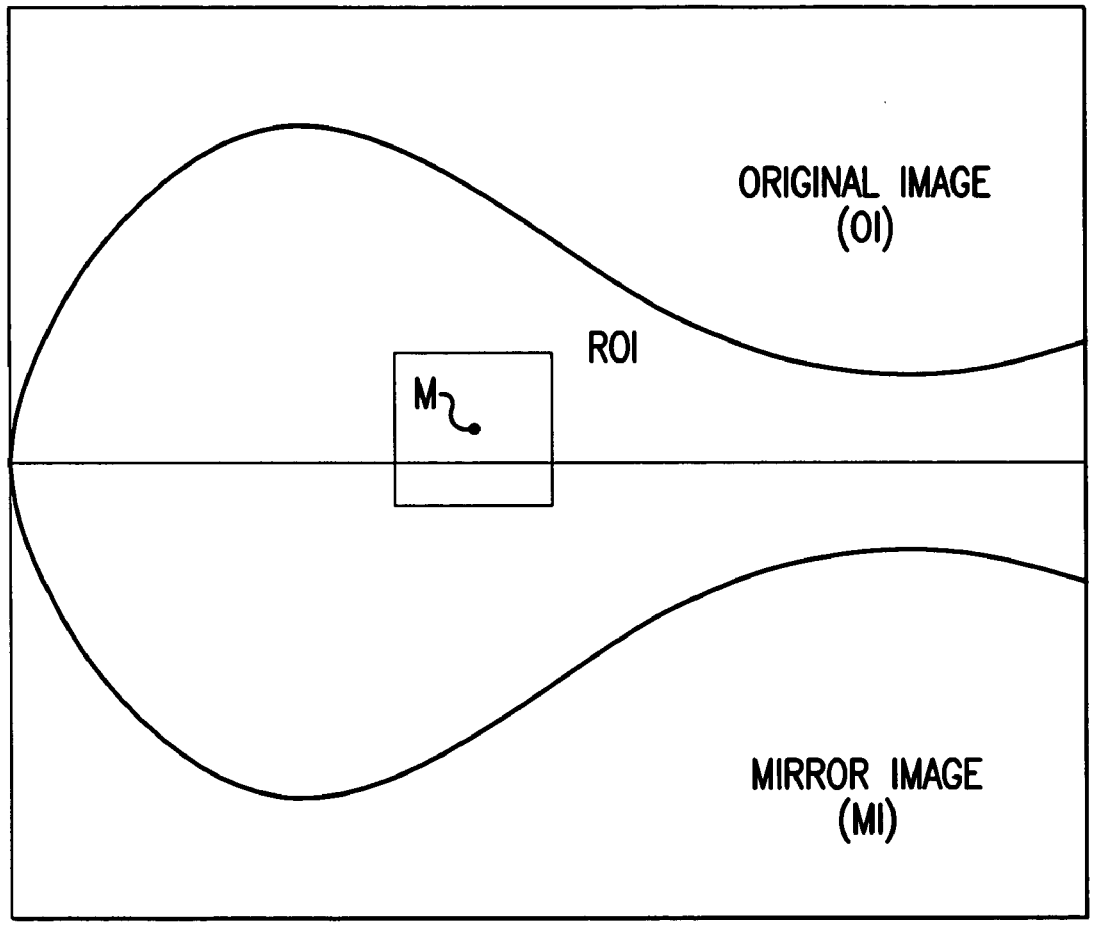
FIG. 3A illustrates an exemplary output of a ROI extraction unit included in an image processing unit for mass segmentation according to an embodiment of the present invention illustrated in FIG. 3.

FIG. 3A illustrates an exemplary output of the ROI extraction unit 247 included in the image preparation module 110A for mass segmentation according to an embodiment of the present invention illustrated in FIG. 3. The ROI includes the mass M. Prior to extracting the ROI, resolution of original image (OI) may be reduced to 200 μl/pixel and a mirror image (MI) of the OI may be obtained. The ROI, which includes the mass M, may be a 50 mm by 50 mm ROI. During extraction of ROI, extremely strong edges may be deleted applying a sobel filter (not shown). Such filter may calculate an edge map and add positions where edge strength is stronger than a fixed threshold to a mask image. A mask image is a binary image which has value 1 in the breast area and value 0 in the background. The threshold may be set high enough to detect only extremely strong edges such as coarse calcification and vessels present in the breast tissue.

Figure 3B:
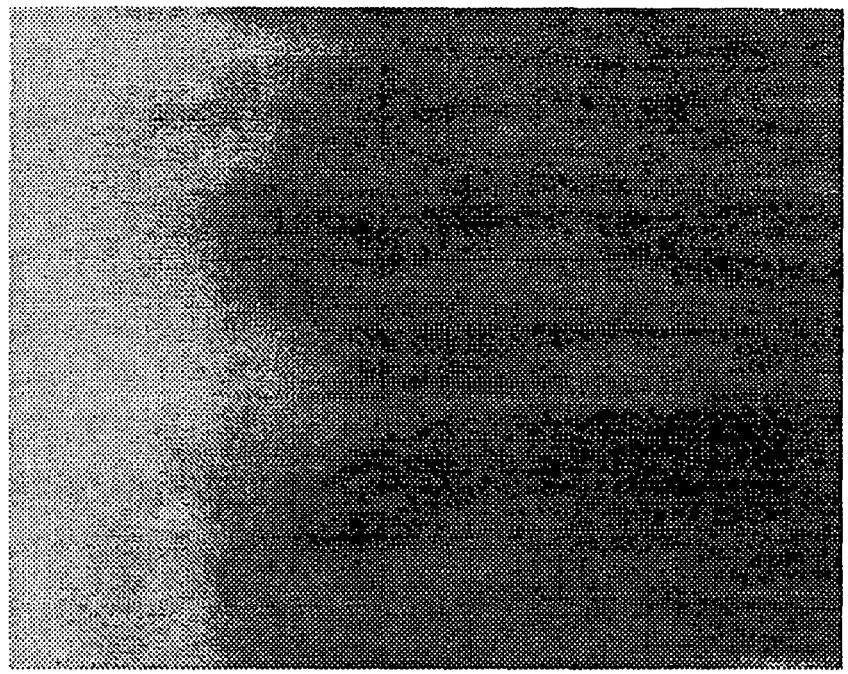
FIG. 3B illustrates an exemplary output of a polar image obtaining unit included in an image processing unit for mass segmentation according to an embodiment of the present invention illustrated in FIG. 3.
Figure 3B:

FIG. 3B illustrates an exemplary output of the polar image obtaining unit 257 included in the image preparation module 110A for mass segmentation according to an embodiment of the present invention illustrated in FIG. 3. Since the shape of most masses is approximately circular, transforming the ROI to polar space is preferred to apply dynamic programming to find the contour of the mass M. In FIG. 3B, the exemplary output represents a polar image of the original ROI where the x axis in the polar image represents the angle from $-\pi$ to $\pi$ and the y axis represents the radius from 0 to 30 mm.

Figure 4:
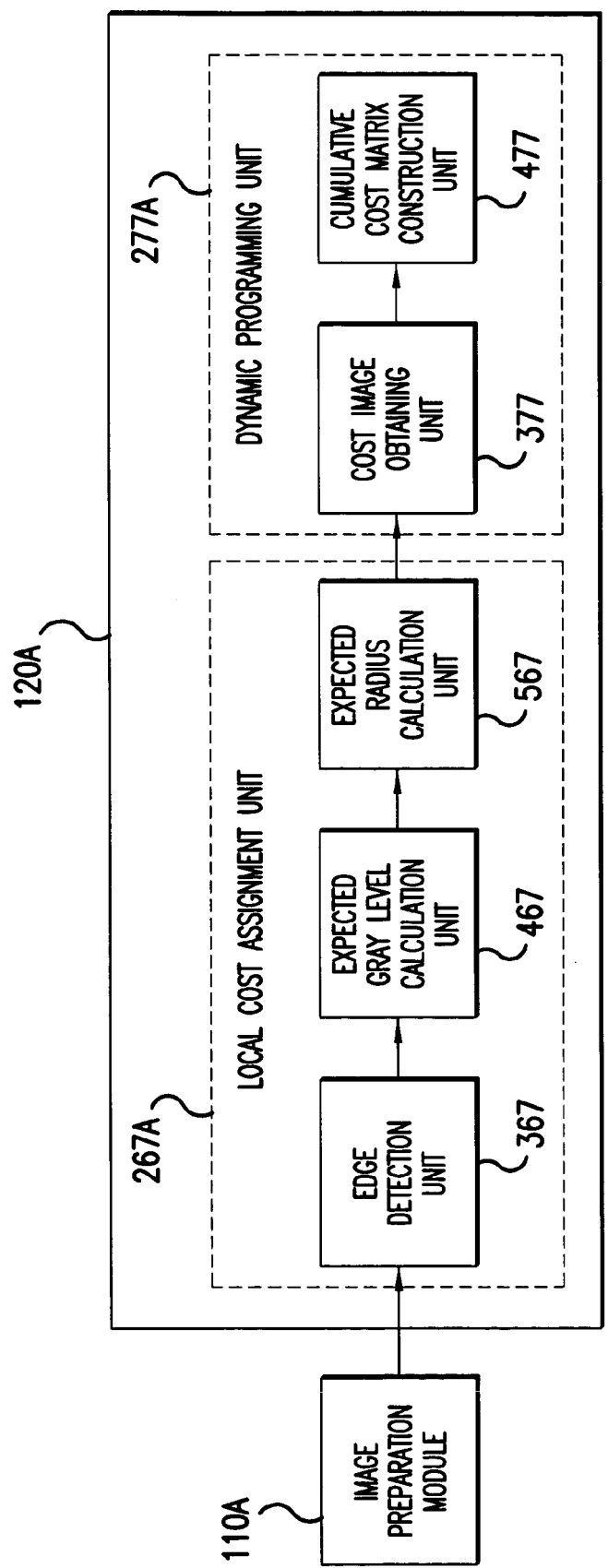
FIG. 4 is a block diagram illustrating in more detail aspects of an exemplary image processing unit for mass segmentation of a breast tissue according to an embodiment of the present invention illustrated in FIG. 3.

FIG. 4 is a block diagram of an exemplary contour finding module 120A for mass segmentation according to an embodiment of the present invention illustrated in FIG. 3. As shown in FIG. 4, contour finding module 120A includes: an edge detection unit 367; an expected gray level calculation unit 467; an expected radius calculation unit 567; a cost image obtaining unit 377; and a cumulative cost matrix construction unit 477. Edge detection unit 367, expected gray level calculation unit 467 and expected radius calculation unit 567 are included in local cost assignment unit 267A and cost image obtaining unit 377 and cumulative cost matrix construction unit 477 are included in dynamic programming unit 277A. Edge detection unit 367, expected gray level calculation unit 467, expected radius calculation unit 567, cost image obtaining unit 377, and cumulative cost matrix construction unit 477 may be implemented using software and/or hardware. Outputs of local cost assignment unit 267A are inputted to dynamic programming unit 277A for finding a final closed contour of the mass M. The output of dynamic programming unit 277A is a breast image with a final closed contour of the mass M. Such an output image may be sent to image output unit 55, printing unit 45, and/or display 65.

Local cost assignment unit 267A and dynamic programming unit 277A may find an optimal path on which the total cost is minimized in the cumulative cost matrix. Edge detection unit 367 may determine an edge strength of the mass M, expected gray level calculation unit 467 may calculate an expected gray level which corresponds with the edge of the mass M outputted from the edge detection unit 367, and expected radius calculation unit 567 may calculate an expected radius to constraint the contour of the mass M in a certain range based on the output obtained from expected gray level calculation unit 467.

Local cost is the cost assigned to each pixel in the polar image obtained by the polar image obtaining unit 257. Local cost assignment unit 267A may define local cost as below:

$$c(i,j) = w_s s(i,j) + w_g g(i,j) + w_r r(i,j) \quad \text{(equation 1)}$$

where s(i, j) represents an edge strength, g(i, j) is a deviation from an expected gray level and r(i, j) is a deviation from an expected mass radius, and $w_s$, $w_g$, and $w_r$ represent the weights of local cost components. In an exemplary embodiment, the local cost assignment unit 267A may assign local cost using $w_s$=2.0, $w_g$=0.5, and $W_r$=0.5

Edge detection unit 367 may compute the edge strength s(i, j). An anisotropic diffusion filter (not shown) may be used to smooth the polar image obtained by the polar image obtaining unit 257. A sobel filter (not shown) may be used to detect the vertical edges of the mass M prior to computing the edge strength s(i, j). The edge strength s(i, j) is determined by normalizing gradient values with the maximum gradient max (y'). Such edge strength determination by normalizing gradient values is known and described in S. Timp et al., "A new 2D segmentation method based on dynamic programming applied to computer aided detection in mammography," in Am. Assoc. Phys. Med., 2004, p. 961. The normalized gradient value is inverted so that high gradients produce low costs and vice versa. The gradient component function may be represented as described in Timp by the following equation:

$$s(i, j) = \frac{\max(y') - y'(i, j)}{\max(y')} \quad \text{(equation 2)}$$

where y' is the gradient magnitude in vertical direction in the polar image obtained by the polar image obtaining unit 257. To prevent the outlier, $99^{th}$ percentile of the gradient values may be measured in the ROI. The magnitudes of the gradients which point from low intensity to high intensity are set to 0 because masses are always brighter than surroundings.

Expected gray level calculation unit 467 may compute a deviation from an expected gray level g(i, j). In the histogram of the ROI, there are mainly two distributions. The one which has a lower intensity represents fatty tissues and/or low intensity breast tissues, and the one which has a higher intensity represents mass and/or high intensity breast tissues. In the case that the ROI is near the skin line, there will be a third distribution which has the lowest intensity and a very wide range. A fixed threshold to cut the flat part in the histogram may be used. In an aspect of the present invention, Gaussian mixture may be used to estimate these two distributions and local minimum between the two Gaussians may be set as expected gray level. Deviation from expected gray level may be defined as a function of intensity value of the pixel (i, j) and expected gray level. Such method is also known and described in S. Timp et al., "A new 2D segmentation method based on dynamic programming applied to computer aided detection in mammography," in Am. Assoc. Phys. Med., 2004, p. 962. The deviation from expected gray level function may be represented as described in Timp by the following equation:

$$g(i,j) = abs[G(i,j) - g] \quad \text{(equation 3)}$$

where G(i, j) is the intensity value of the pixel (i, j) and g is the expected gray level.

Expected radius calculation unit 567 may compute a deviation from an expected mass radius r(i, j). The expected radius calculation unit 567 receives information outputted from the expected gray level calculation unit 467 to compute expected mass size and/or deviation from an expected mass radius r(i, j). If only the edge strength component is used, the contour found by the dynamic programming unit 277A may go too far or too near if there is no obvious edge. Thus, application of expected radius to constraint the contour in a certain range may be preferred. To estimate expected mass radius, deviation from expected gray level g(i, j) can be used as local cost to find a final contour of the mass M by the dynamic programming unit 277A. In order to compute the deviation from an expected mass radius r(i, j), setting a median radius R as the expected radius and calculating a standard deviation σ may be required. According to an embodiment of the present invention illustrated in FIG. 4, the deviation from the expected mass radius may be represented as:

$$r(i,j) = \begin{cases} 1.0 - \frac{1}{\sqrt{2\pi\sigma_1^2}} \exp\left(-\frac{(j+\sigma_1-R)^2}{2\sigma_1^2}\right) \Big/ g\max & \text{when } (j < R - \sigma_1) \\ 0.0 & \text{when } (R - \sigma_1 \le j \le R + \sigma_1) \\ 1.0 - \frac{1}{\sqrt{2\pi\sigma_1^2}} \exp\left(-\frac{(j-\sigma_1-R)^2}{2\sigma_1^2}\right) \Big/ g\max & \text{when } (j > R + \sigma_1) \end{cases} \quad \text{(equation 4)}$$

where σ represents standard deviation, R represents expected mass radius, $$\sigma_1 = 1.5\sigma, \text{ and } g\max = \frac{1}{\sqrt{2\pi\sigma_1^2}}.$$

Application of a cost function to all pixels in the polar image obtained by the polar image obtaining unit 257 as described in equation 1 above produces a cost image by the cost image obtaining unit 377 included in the dynamic programming unit 277A. This image can be seen as a graph in which the dynamic programming unit 277A finds a path with the lowest cost. The pixels in the first column of the cost image c(i, 0) represent the start nodes for the dynamic programming algorithm performed by the dynamic programming unit 277A, whereas the end nodes are represented by the pixels in the last column of the image. The cumulative cost matrix construction unit 477 receives outputs from cost image obtaining unit 377 and constructs a cumulative cost matrix in two steps. Such construction of cost matrix is known and described in S. Timp et al., "A new 2D segmentation method based on dynamic programming applied to computer aided detection in mammography," in Am. Assoc. Phys. Med., 2004, p. 963. First cumulative costs of pixels in the first column are set equal to the cost of the following pixels as:

$$C(i,0) = c(i,0) \quad \text{(equation 5)}$$

where C(i,0) represents cumulative cost and c(i, 0) represents the cost value for pixel (i, j) in the polar image obtained by the polar image obtaining unit 257. For other pixels the cumulative cost is calculated by a recursive step described below:

$$C(i, j+1) = \min_{-m \le l \le m} C(i+l, j) + c(i, j+1) + h(l) \quad \text{(equation 6)}$$

The additional cost of a segment of the path for column j to j+1 depends on the cost value of pixel (i, j) and direction l. The cost of the direction is set according to a function h(l) which may control smoothness. h(l) is set to infinity for directions outside an interval [−3, . . . , 3] and 0 inside an interval [−3, . . . , 3]. A final contour of the mass M is found by selecting those pixels that linked together from the boundary with the lowest cost. The end point C(i, π) of the contour is the pixel in the last column of the cumulative cost matrix with the lowest cost constructed by the cumulative cost matrix construction unit. Original path may be found by backtracking the path from the end pixel to one of the pixels in the first column. The optimal path in the polar image (PI) is then transformed back to rectangular coordinates in the original image (OI).

According to an embodiment of the present invention, the cumulative cost matrix construction unit 477 may also construct an extended cost matrix where costs are plotted in an interval from −3π to 3π. Dynamic programming algorithm is applied to find the optimal path in this extended cost matrix. Such extended cost matrix algorithm may guarantee a final closed contour of the mass M in situations where the mass M may be vague or where other structures obscure the mass boundary.

Figure 5:
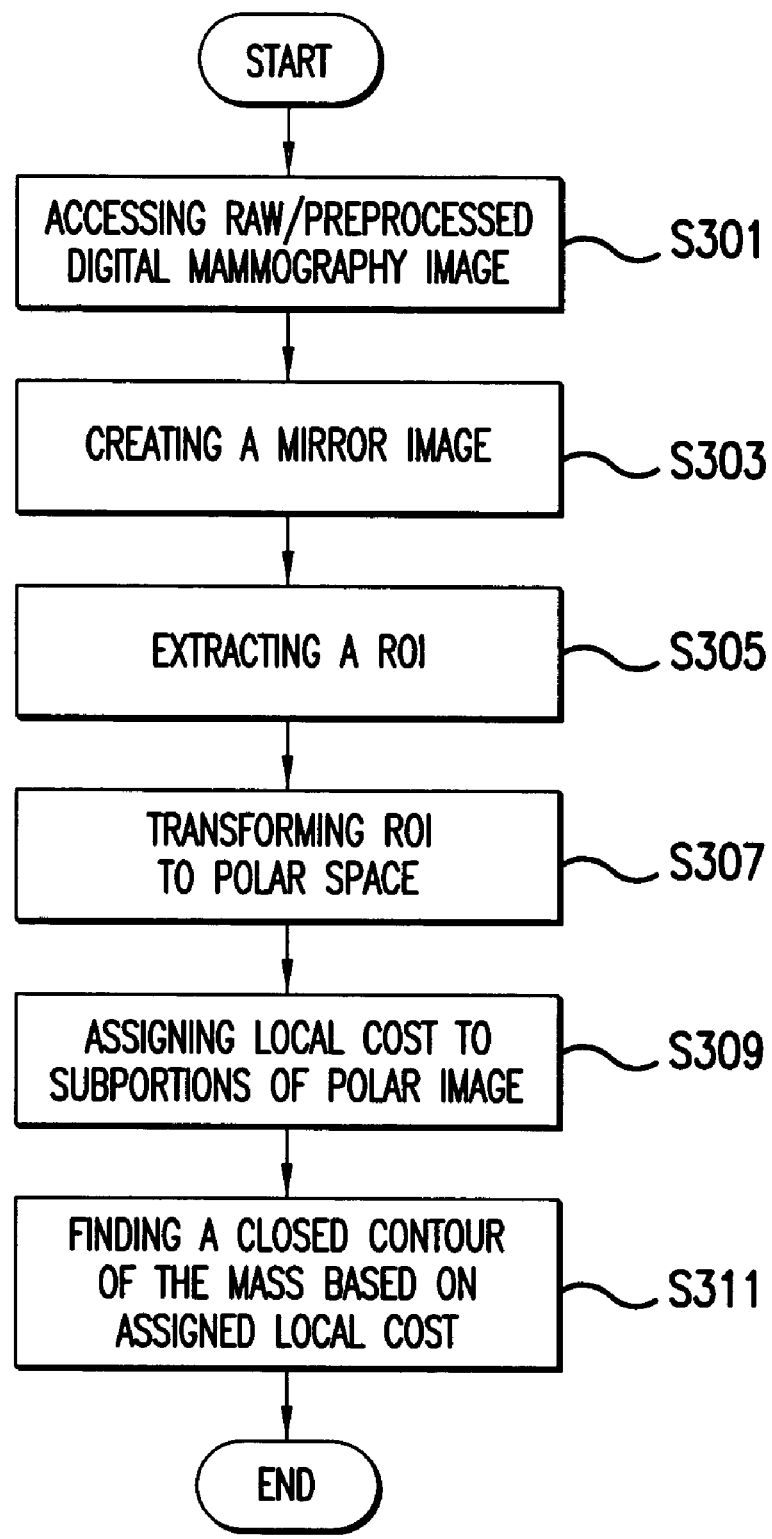
FIG. 5 is a flow diagram illustrating operations performed by an image processing unit that includes a mirror image obtaining unit for mass segmentation according to an embodiment of the present invention illustrated in FIG. 3.

FIG. 5 is a flow diagram illustrating operations performed by an image processing unit 35A which includes a mirror image obtaining unit 237 for mass segmentation according to an embodiment of the present invention illustrated in FIG. 3. Mirror image obtaining unit 237 receives (S301) a raw or a preprocessed breast image from image input unit 25, and creates (S303) a mirror image of the received image. ROI extraction unit 247 receives the mirror image and extracts (S305) a ROI that includes a portion of the original image received in step S301 and a portion of the mirror image received in step S303. Prior to extracting the ROI, resolution of original image may be reduced to 200 μm/pixel and a mirror image of the original image may be obtained. The ROI, which includes the mass M, may be a 50 mm by 50 mm ROI. During extraction of ROI, extremely strong edges may be deleted applying a sobel filter (not shown). The reason for deleting extremely strong edges is that the segmentation algorithm is designed to find the contour mainly by the edge strength (see equation 1). Thus if there are extremely strong edge around the mass, the cost on those strong edges may be lower than on the true mass, which may lead the dynamic programming to find the contour on those strong edges instead of the true mass edge. The sobel filter may calculate an edge map and add positions where edge strength is stronger than a fixed threshold to a mask image discussed above. Polar image obtaining unit 257 receives the ROI and transforms (S307) the ROI into polar space to obtain a polar image of the ROI. Local cost assignment unit 267 receives the polar image and assigns (S309) local cost to sub portions of the polar image. Finally, the dynamic programming unit 277 finds (S311) a closed contour of the mass M based on the assigned local costs received from the local cost assignment unit 267.

Figure 6:
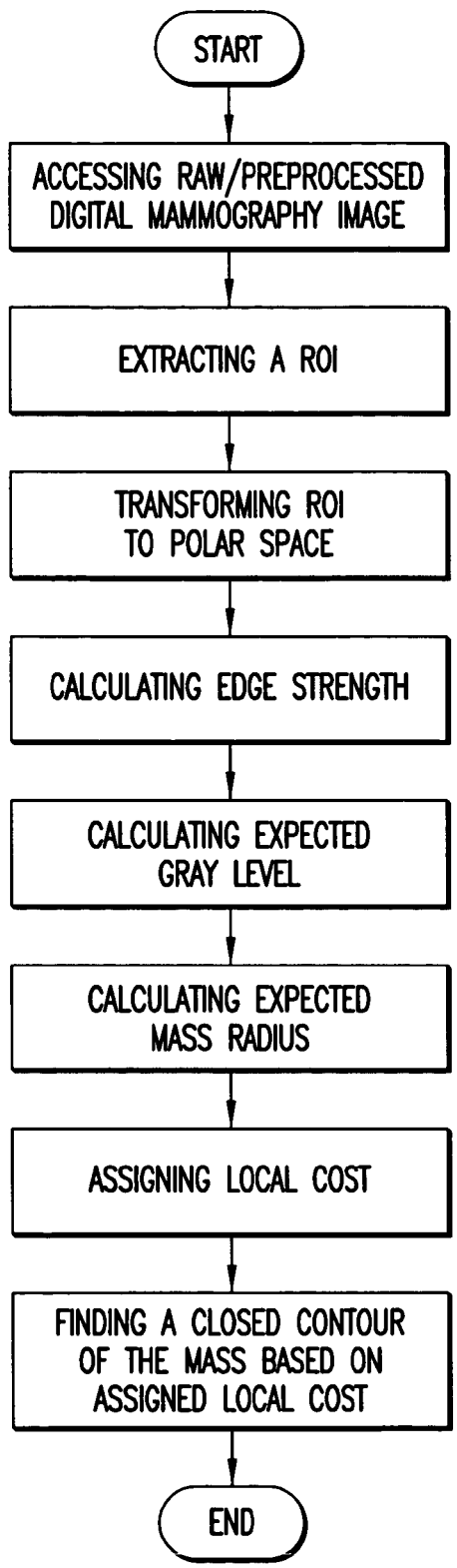
FIG. 6 is a flow diagram illustrating operations performed by an image processing unit for mass segmentation according another embodiment of the present invention illustrated in FIG. 4.

FIG. 6 is a flow diagram illustrating operations performed by an image processing unit 35A which includes a local cost assignment unit 267A and a dynamic programming unit 277A for mass segmentation according another embodiment of the present invention illustrated in FIG. 4. ROI extraction unit 247 receives (S401) a raw or a preprocessed breast image from image input unit 25 and extracts (S403) a ROI which includes the mass M. The ROI may include a 50 mm by 50 mm portion of the received image. Prior to extracting the ROI, resolution of original image may be reduced to 200 μm/pixel. During extraction of ROI, extremely strong edges may be deleted applying a sobel filter (not shown). Such filter may calculate an edge map and add positions where edge strength is stronger than a fixed threshold to a mask image discussed above. Polar image obtaining unit 257 receives the ROI and transforms (S405) the ROI into polar space to obtain a polar image of the ROI. Edge detection unit 367 receives the polar image and calculates (S407) edge strength by normalizing gradient values with maximum gradient max(y'), where y' is a gradient magnitude in vertical direction in the polar image. Expected gray level calculation unit 467 receives information from edge detection unit 367 and calculates (S409) expected gray level with histogram according to an embodiment of the present invention. Expected gray level calculation unit 467 may also calculate an expected gray level with Gaussian Mixture, wherein the expected gray level corresponds with an edge of the mass M. Expected gray level calculation unit 467 may set a threshold to cut any flat part in the histogram. Expected radius calculation unit 567 receives expected gray level information and calculates (S411) an expected mass radius and a deviation from an expected mass radius. Outputs from local cost assignment unit 267A which represent outputs from edge detection unit 367, expected gray level calculation unit 467 and expected radius calculation unit 567 are assigned (S413) local cost as a weighted combination of edge strength, expected gray level, and expected mass radius. In an exemplary embodiment, the weight of edge strength may be larger in value than weight of expected gray level. In an another exemplary embodiment, the weight of edge strength may be larger than the weight of expected gray level and the weight of the expected gray level and the weight of the expected mass radius may be approximately equal. Yet, in an another exemplary embodiment, the ratio for the weights of edge strength, expected gray level, and expected mass radius may be approximately 1:0.25:0.25. The dynamic programming unit 277A finds (S415) a closed contour of the mass M based on the assigned local costs received from the local cost assignment unit 267A. In an exemplary embodiment of the present invention, edge strength and expected gray level can be used to find the contour. In an another exemplary embodiment of the present invention, edge strength, expected gray level, and expected mass radius can be used to find the contour of the mass M.

Figure 7A:
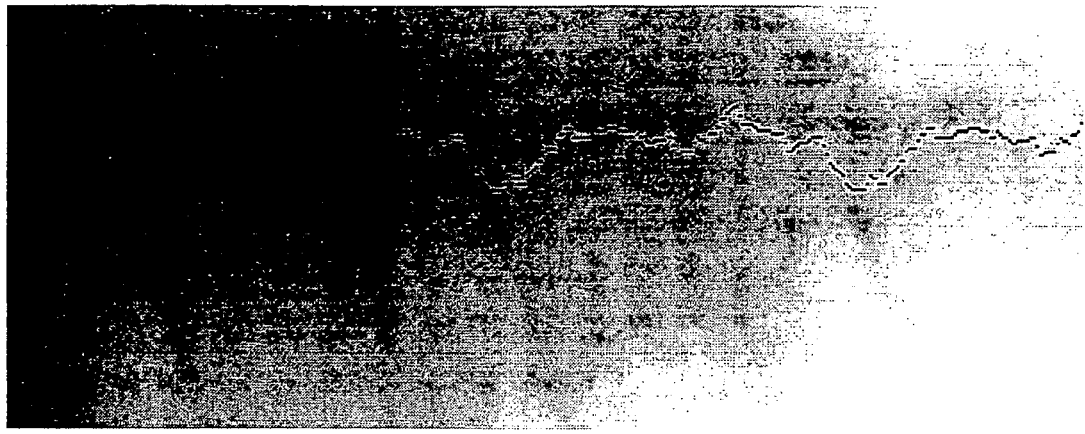
FIG. 7A illustrates an exemplary image of a final contour found in cumulative cost matrix (−3π, 3π) by a dynamic programming unit included in an image processing unit for mass segmentation according to an embodiment of the present invention illustrated in FIG. 4.
Figure 7B:
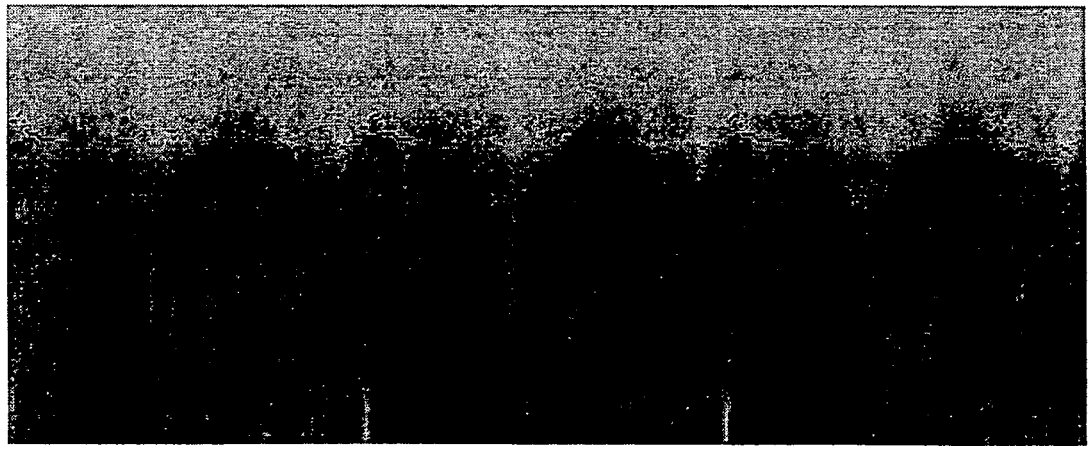
FIG. 7B illustrates an exemplary image of a final contour found on polar image (−3π, 3π) by a dynamic programming unit included in an image processing unit for mass segmentation according to an embodiment of the present invention illustrated in FIG. 4.
Figure 7C:
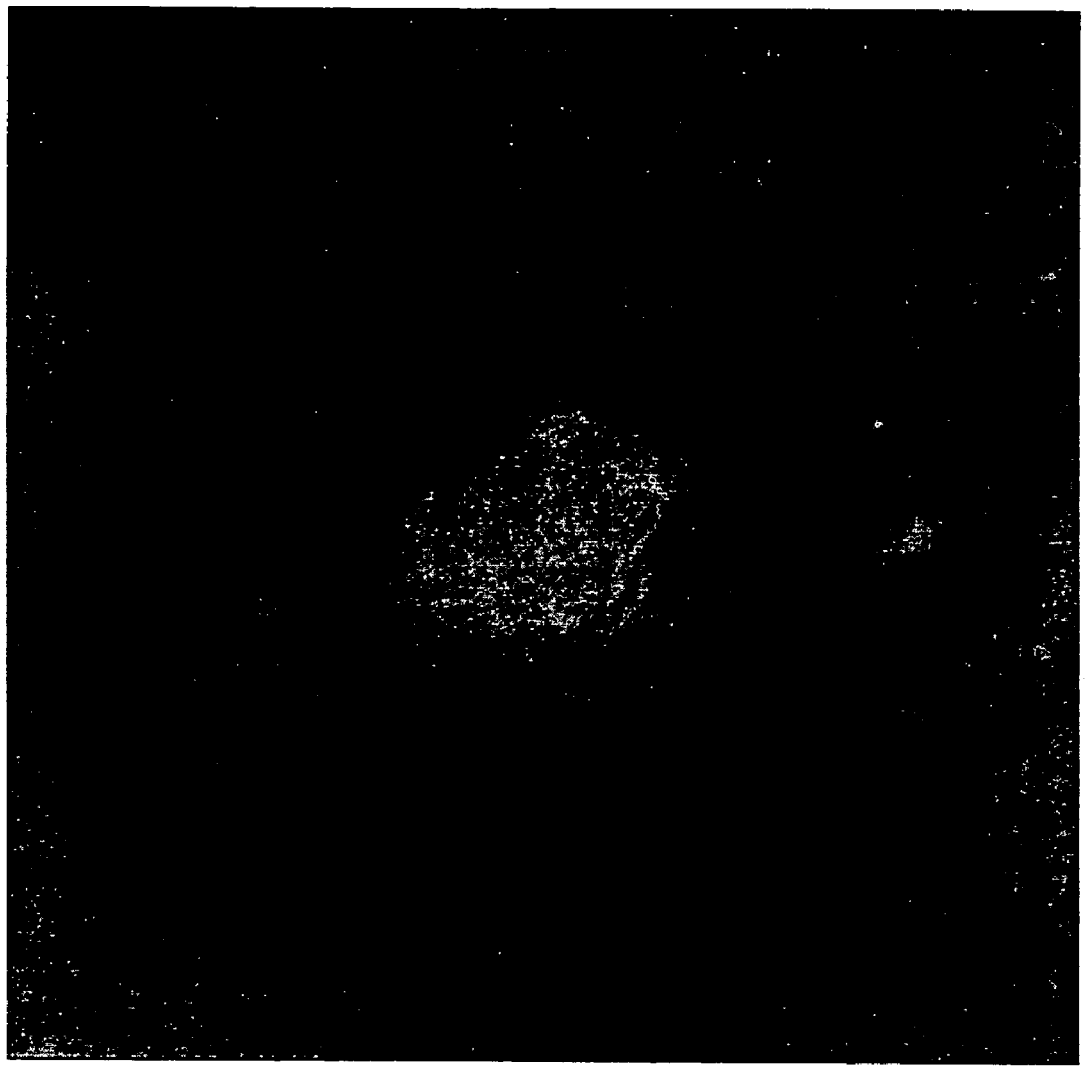
FIG. 7C illustrates an exemplary image of a final contour found on original ROI by a dynamic programming unit included in an image processing unit for mass segmentation according to an embodiment of the present invention illustrated in FIG. 4.

FIGS. 7A-7C illustrates exemplary outputs of an image processing unit 35A for mass segmentation according to an embodiment of the present invention illustrated in FIG. 4.

FIG. 7A illustrates an exemplary image of a final contour found in cumulative cost matrix ($-3\pi$, $3\pi$) by the dynamic programming unit 277A included in the image processing unit 35A for mass segmentation according to an embodiment of the present invention illustrated in FIG. 4.

FIG. 7B illustrates an exemplary image of a final contour found on polar image ($-3\pi$, $3\pi$) by the dynamic programming unit 277A included in the image processing unit 35A for mass segmentation according to an embodiment of the present invention illustrated in FIG. 4.

FIG. 7C illustrates an exemplary image of a final contour found on original ROI by the dynamic programming unit 277A included in the image processing unit 35A for mass segmentation according to an embodiment of the present invention illustrated in FIG. 4.

Although detailed embodiments and implementations of the present invention have been described above, it should be apparent that various modifications are possible without departing from the spirit and scope of the present invention.

We claim:

1. A method for automatic segmentation of an image representing a mass of a tissue region, comprising:
   accessing digital image data representing an image including said mass of the tissue region;
   creating a mirror image of said digital image data;
   extracting a Region of Interest (ROI) which includes a portion of said mirror image containing said mass;
   transforming the ROI to polar space for obtaining a polar image of the ROI;
   assigning local cost to sub portions of said polar image; and
   finding a contour of the mass based on said assigned local cost.

2. The method according to claim 1, further comprising:
   smoothing the polar image by applying an anisotropic diffusion filter.

3. The method according to claim 1, further comprising:
   assigning local cost based on the following cost function:

$$c(i,j) = w_s s(i,j) + w_g g(i,j) + w_r r(i,j)$$

where s(i, j) represents an edge strength, g(i, j) is a deviation from an expected gray level and r(i, j) is a deviation from an expected mass radius, and $w_s$, $w_g$, and $w_r$ represent the weights of local cost components.

4. The method according to claim 3, further comprising:
   assigning local cost using $w_s$=2.0, $w_g$=0.5 and $w_r$=0.5.

5. The method according to claim 4, further comprising:
   determining the edge strength by normalizing gradient values with maximum gradient max(y'), where y' is a gradient magnitude in vertical direction in the polar image.

6. The method according to claim 5, further comprising:
   defining the edge strength as:

$$s(i, j) = \frac{\max(y') - y'(i, j)}{\max(y')}$$

where y' is the gradient magnitude in vertical direction in the polar image.

7. The method according to claim 3, further comprising:
   defining the deviation from the expected gray level as:

$$g(i,j) = abs[G(i,j) - g]$$

where G(i, j) is the intensity value of the pixel (i, j) and g is the expected gray level.

8. The method according to claim 3, further comprising:
   defining the deviation from the expected mass radius as:

$$r(i, j) = \begin{cases} \left(1.0 - \frac{1}{\sqrt{2\pi\sigma_1^2}} \exp\left(-\frac{(j+\sigma_1-R)^2}{2\sigma_1^2}\right)\right) / g\max & \text{when } (j < R - \sigma_1) \\ 0.0 & \text{when } (R - \sigma_1 \le j \le R + \sigma_1) \\ \left(1.0 - \frac{1}{\sqrt{2\pi\sigma_1^2}} \exp\left(-\frac{(j-\sigma_1-R)^2}{2\sigma_1^2}\right)\right) / g\max & \text{when } (j > R + \sigma_1) \end{cases}$$

where σ represents standard deviation, R represents expected mass radius, $$\sigma_1 = 1.5\sigma, \text{ and } g\max = \frac{1}{\sqrt{2\pi\sigma_1^2}}.$$

9. The method according to claim 3, further comprising: calculating expected gray level with histogram, wherein the expected gray level is a gray level which corresponds with the edge of the mass.

10. The method according to claim 9, further comprising: setting a fixed threshold to cut any flat part in the histogram.

11. The method according to claim 3, further comprising: calculating expected gray level with Gaussian Mixture, wherein the expected gray level is a gray level which corresponds with the edge of the mass.

12. An apparatus for automatic segmentation of an image representing a mass of a tissue region, comprising:
   an image data input unit for accessing digital image data representing an image including said mass of the tissue region;
   a mirror image obtaining unit for creating a mirror image of said digital image data;
   a Region of Interest (ROI) extraction unit for extracting a ROI which includes a portion of said mirror image containing said mass;
   an image transforming unit for transforming said ROI to polar space for obtaining a polar image of the ROI;
   a local cost assignment unit for assigning local cost to sub portions of said polar image; and
   a dynamic programming unit for finding a contour of the mass based on said assigned local cost.

13. The apparatus according to claim 12, wherein said local cost assignment unit assigns local cost based on the following cost function:

$c(i,j) = w_s s(i,j) + w_g g(i,j) + w_r r(i,j)$ where s(i, j) represents an edge strength, g(i, j) is a deviation from an expected gray level and r(i, j) is a deviation from an expected mass radius, and $w_s$, $w_g$, and $w_r$ represent the weights of local cost components.

14. The apparatus according to claim 13, wherein said local cost assignment unit assigns local cost using $w_s$=2.0, $w_g$=0.5 and $w_r$=0.5.

15. The apparatus according to claim 14, wherein said local cost assignment unit includes an edge detection unit for determining the edge strength by normalizing gradient values with maximum gradient max(y'), where y' is a gradient magnitude in vertical direction in the polar image.

16. The apparatus according to claim 15, wherein said edge detection unit defines the edge strength as:

$$s(i, j) = \frac{\max(y') - y'(i, j)}{\max(y')}$$

where y' is the gradient magnitude in vertical direction in the polar image.

17. The apparatus according to claim 13, wherein said local cost assignment unit includes an expected gray level calculation unit for calculating the deviation from the expected gray level as:

$g(i,j) = abs[G(i,j) - g]$ where G(i, j) is the intensity value of the pixel (i, j) and g is the expected gray level.

18. The apparatus according to claim 13, wherein said local cost assignment unit includes an expected mass radius calculation unit for defining the deviation from the expected mass radius as:

$$r(i, j) = \begin{cases} \left(1.0 - \frac{1}{\sqrt{2\pi\sigma_1^2}} \exp\left(-\frac{(j+\sigma_1-R)^2}{2\sigma_1^2}\right)\right) / g\max & \text{when } (j < R - \sigma_1) \\ 0.0 & \text{when } (R - \sigma_1 \le j \le R + \sigma_1) \\ \left(1.0 - \frac{1}{\sqrt{2\pi\sigma_1^2}} \exp\left(-\frac{(j-\sigma_1-R)^2}{2\sigma_1^2}\right)\right) / g\max & \text{when } (j > R + \sigma_1) \end{cases}$$

where σ represents standard deviation, R represents expected mass radius, $$\sigma_1 = 1.5\sigma, \text{ and } g\max = \frac{1}{\sqrt{2\pi\sigma_1^2}}.$$

19. The apparatus according to claim 17, wherein said expected gray level calculation unit calculates an expected gray level with histogram, wherein the expected gray level is a gray level which corresponds with an edge of the mass.

20. The apparatus according to claim 19, wherein said expected gray level calculation unit sets a threshold to cut any flat part in the histogram.

21. The apparatus according to claim 17, wherein said expected gray level calculation unit calculates an expected gray level with Gaussian Mixture, wherein the expected gray level is a gray level which corresponds with an edge of the mass.

22. A computer readable storage medium having stored thereon computer executable program for automatic segmentation of an image representing a mass of a tissue region, the computer program when executed causes a processor to execute steps of:

accessing digital image data representing an image including said mass of the tissue region;

creating a mirror image of said digital image data;

extracting a Region of Interest (ROI) which includes a portion of said mirror image containing said mass;

transforming the ROI to polar space for obtaining a polar image of the ROI;

assigning local cost to sub portions of said polar image; and finding a contour of the mass based on said assigned local cost.

\* \* \* \* \*